United States Patent
Burg et al.

(10) Patent No.: US 6,427,007 B1
(45) Date of Patent: *Jul. 30, 2002

(54) SYSTEM AND METHOD FOR COMPLETING A CALL WHILE AT LEAST ONE CALL IS ESTABLISHED USING ANALOG INTERFACE TO TELEPHONE NETWORK

(75) Inventors: Fred M. Burg, West Long Branch; Anthony Schinao, Long Valley; Mostafa Hashem Sherif, Tinton Falls; Kamlesh T. Tewani, Freehold, all of NJ (US)

(73) Assignee: AT&T Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,940

(22) Filed: Jun. 11, 1999

Related U.S. Application Data

(63) Continuation-in-part of application No. 08/647,302, filed on May 9, 1996, now abandoned.

(51) Int. Cl.⁷ .......................... H04M 3/42; H04M 7/00; H04M 11/00; H04Q 11/04

(52) U.S. Cl. .................. 379/201.01; 370/259; 370/487; 370/493; 370/496; 379/207.13; 379/211.02; 379/230; 379/93.34

(58) Field of Search .................... 370/259, 487, 370/490, 493, 494, 495; 379/93.28, 93.34, 201, 202, 207, 230, 201.01, 202.01, 207.13, 211.02

(56) References Cited

U.S. PATENT DOCUMENTS

| 4,700,379 A | 10/1987 | Ingelbright |
| 5,182,768 A | 1/1993 | Nakano et al. |
| 5,214,650 A | 5/1993 | Renner et al. |

(List continued on next page.)

FOREIGN PATENT DOCUMENTS

| DE | 34 40 307 A | 5/1996 |
| EP | 0 653 872 A | 5/1995 |
| EP | 0 674 420 A | 9/1995 |
| GB | 2187611 A | 9/1987 |

OTHER PUBLICATIONS

Tewani, K., Requirements on PSTN's to Support Evolving Multimedia Applications, International Telecommunication Union; May 1995.

(List continued on next page.)

Primary Examiner—Harry S. Hong
(74) Attorney, Agent, or Firm—Morgan & Finnegan, LLP

(57) ABSTRACT

The system and method of the present invention attempts completion of one call, while at least one call is in progress, between terminal equipment and a telecommunications network where the terminal equipment is connected by a point-of-attachment having a single phone number to a public switched telephone network where a dial tone is provided to the premises. Multiple calls are now allowed with an analog interface to the public switched telephone network. At least one call and control channel are combined into a modulated analog signal having a separate channel for each call and transmitted through a modulation/demodulation device as a modulated analog signal to the public switched telephone network. The modulated analog signal is split into respective calls and control channel. Each call is forwarded to a respective remote device based on the identity information and auxiliary information received through the control channel.

8 Claims, 5 Drawing Sheets

U.S. PATENT DOCUMENTS

| | | |
|---|---|---|
| 5,428,608 A | 6/1995 | Freeman et al. |
| 5,453,986 A | 9/1995 | Davis et al. |
| 5,513,212 A | 4/1996 | Bremer |
| 5,537,436 A | 7/1996 | Bottoms et al. |
| 5,606,599 A | 2/1997 | O'Mahony et al. |
| 5,625,677 A | 4/1997 | Feiertag et al. |
| 5,648,825 A | 7/1997 | Ko |
| 5,682,386 A | 10/1997 | Arimilli et al. ............. 370/468 |
| 5,809,070 A | 9/1998 | Krishnan et al. |

OTHER PUBLICATIONS

Multimedia Packet Protocol; Sep. 1995.

Protocol Proposals for the Net.

Control Channel Requirements for the Network Interface in Support of Multi–media Applications in PSTN Environments; Sep. 1995.

Control Channel Signaling Requirements; Nov. 1995.

Control Channel Signaling Protocol; Nov. 1995.

SYSTEM AND METHOD FOR COMPLETING A CALL WHILE AT LEAST ONE CALL IS ESTABLISHED USING ANALOG INTERFACE TO TELEPHONE NETWORK

CROSS-REFERENCE TO RELATED APPLICATION

This application is a continuation-in part to commonly assigned abandoned U.S. patent application Ser. No. 08/647,302 filed on May 9, 1996 entitled System And Method For Completing Two Calls Using Analog Interface To Switched Telephone Network and claims priority under 35 U.S.C. §120 to such application. If U.S. patent application Ser. No. 08/647,302 was not copending at the time of filing this application, this application is related to commonly assigned pending U.S. patent application Ser. No. 09/326,887 filed on Jun. 7, 1999 entitled System And Method For Completing Two Calls Using Analog Interface To Switched Telephone Network and claims priority under 35 U.S.C. §120 to such application which is further related to commonly assigned abandoned U.S. patent application Ser. No. 08/647,302 filed on May 9, 1996 entitled System And Method For Completing Two Calls Using Analog Interface To Switched Telephone Network and claims priority under 35 U.S.C. §120 to such application.

FIELD OF THE INVENTION

This invention relates to a system and method for attempting to complete a call, while at least one call is in progress, between a subscriber premises and telephone network where the subscriber premises is connected by a single point-of-attachment having a single phone number using an analog interface.

BACKGROUND OF THE INVENTION

Multiple calls often are established over digital networks from terminals connected by a point-of-attachment identified by a single terminal number. For example, networks using packet-switched data networks, described in ITU-T recommendations X.25, use digital terminations and allow multiple calls over the network. Other examples include frame-relay networks, described in ITU-T recommendation I.233; narrow-band ISDN, described in ITU-T recommendation I.210; and broad-band ISDN networks, described in ITU-T recommendation I.211. These services use digital terminations that can be expensive to implement and maintain.

It would be advantageous if a premises connected by a point-of-attachment to the public switched Telephone Network (PSTN) having a single phone number for handling voice calls with the standard, analog "tip-and-ring" interface could carry a modulated signal between the premises and the public switched telephone network that includes multi-call capability from terminal equipment located on the premises, such as a telephone, video, fax machine, or computer. This would be advantageous, for example, if someone at a premises is using a computer while at the same time a telephone call needs to be made to a different location. Other examples could include someone making two telephone calls to the network, or using a computer and fax machine or a telephone and fax machine simultaneously.

It is therefore desirable if a method and system could attempt to complete a call, while at least one call is in progress, using terminal equipment which is connected by a point-of-attachment having a single phone number to a public switched telephone network without digital termination such as ISDN systems.

SUMMARY OF THE INVENTION

The present invention now allows a method and system for attempting to complete a call using terminal equipment, while at least one call is in progress, which is connected by a point-of-attachment having a single phone number to a telephone network where one dial tone is provided on an analog interface to the premises. The method and system of this invention permits multiple calls, such as an analog phone, video, data, fax and comparable calls over a single analog interface. It can be extended to allow an increased number of calls by utilizing additional analog interfaces. Such an extension, sometimes known as a multi-link arrangement, provides for any allocation of the multiple calls across the plurality of analog interfaces.

In accordance with one aspect of the present invention, a control channel is established between the telephone network, such as a public switched telephone network, and the terminal equipment located at the premises. Calls originating from the premises equipment and the control channel are combined at the premises into a modulated analog signal having a separate channel for each call. Likewise, any incoming calls are combined with the above calls and the control channel for transmission between the customer premises and the public switched telephone network. Identity information is transmitted from the originating terminal equipment through the control channel to aid in determining a remote device with which a call is desired. This includes auxiliary information for progressing the call. The signal is transmitted from a modulation/demodulation device as a modulated analog signal to the public switched telephone network. The modulated analog signal is split into respective calls and the control channel, and the calls are then forwarded to a respective remote device based on identity information and auxiliary information received through the control channel.

In one aspect of the present invention, the calls can be split at the public switched telephone network. The public switched telephone network can also include a cellular network. Identifiers are associated with each channel for distinguishing each channel within the public switched telephone network. Each channel can also comprise a plurality of information blocks, and identifiers can be associated between the public switched telephone network and the terminal equipment for each channel to distinguish the information blocks belonging to each call or control channel.

BRIEF DESCRIPTION OF THE DRAWINGS

The foregoing and other objects and advantages of the present invention will be appreciated more fully from the following description, with references to the accompanying drawings in which.

DETAILED DESCRIPTION OF THE INVENTION

Figure 1:
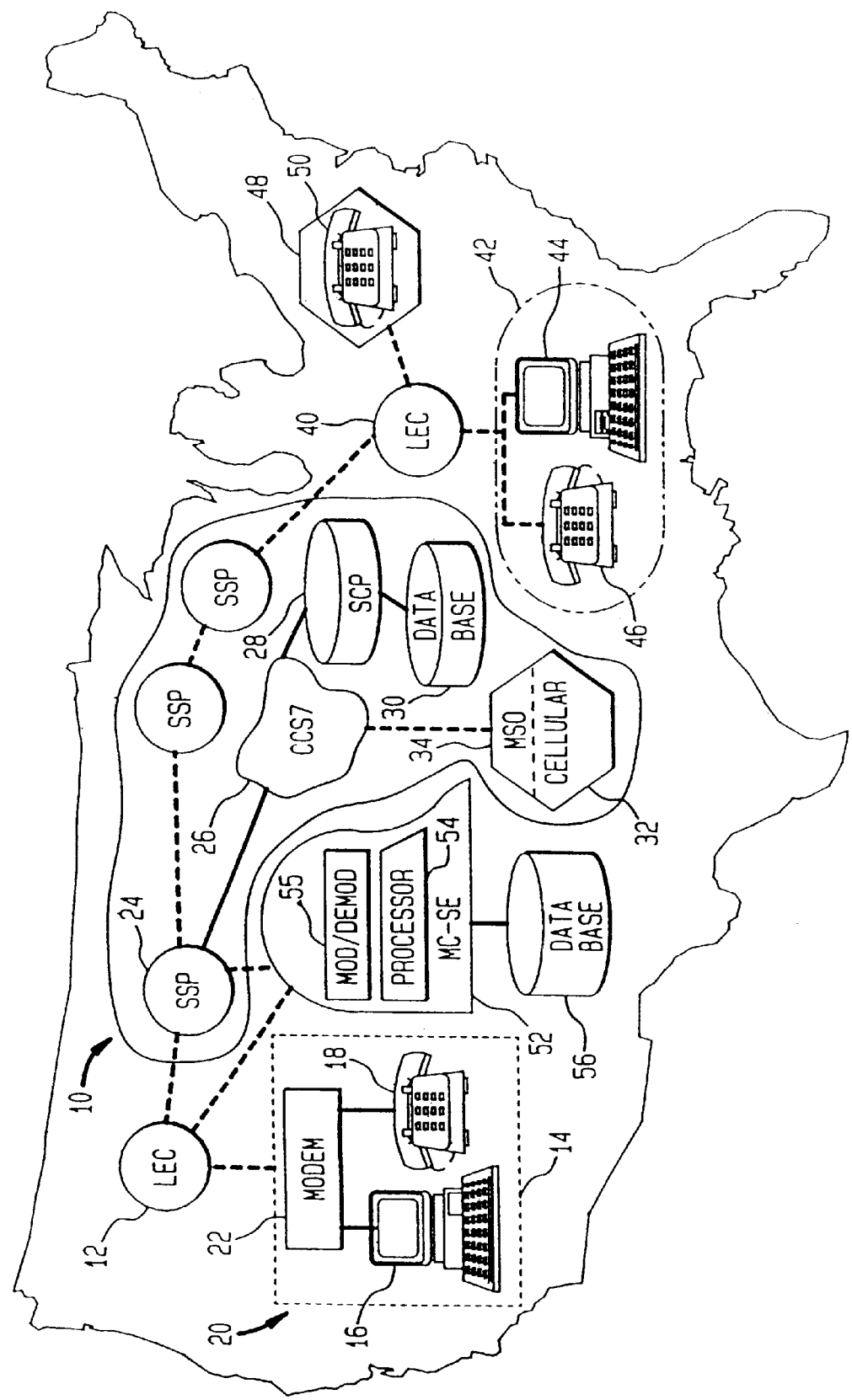
FIG. 1 is a simplified block diagram of a telephone network including the intelligent network components of the public switched telephone network and other components suitable for use with the present invention.
Figure 2:
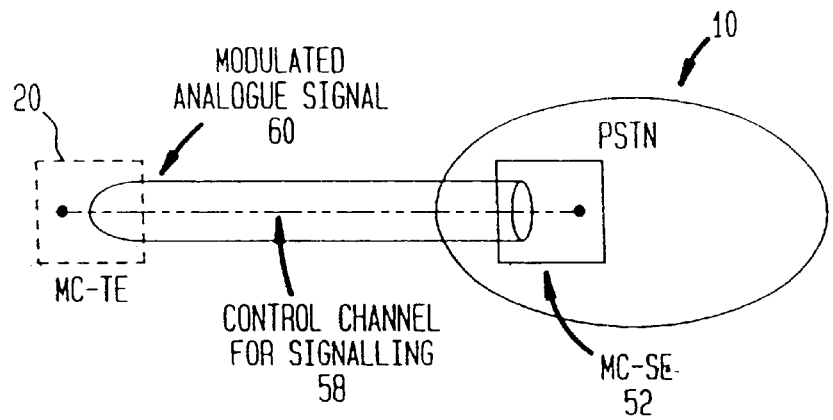
FIG. 2 is a schematic representation of the control channel between terminal equipment at the premises and the public switched telephone network.
Figure 3:
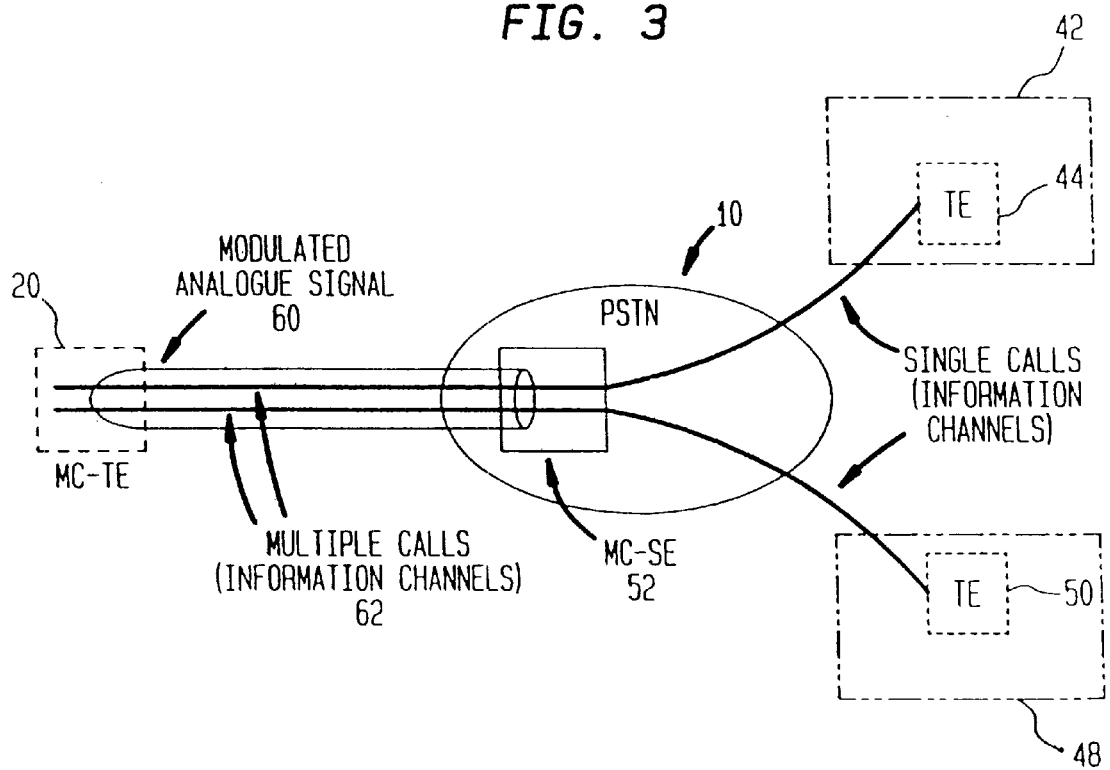
FIG. 3 shows in greater detail multiple channels between the terminal equipment and the public switched telephone network and respective calls extending to remote units.
Figure 4:
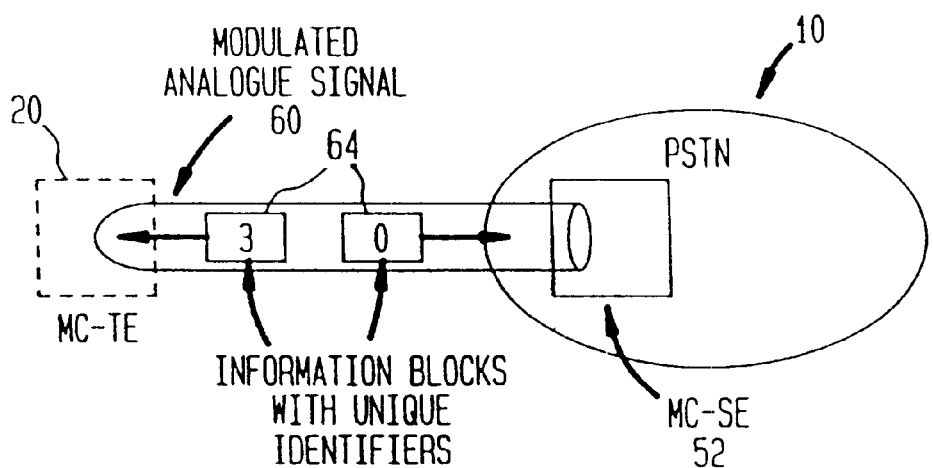
FIG. 4 shows in greater detail the use of identifiers for information blocks to distinguish between calls.

Referring now to FIG. 1, there is illustrated an overview of the public switched telephone network 10 that is connected via a first Local Exchange company (LEC) 12 to a premises 14, such as a residential premises, having a personal computer 16 and analog telephone 18. The present method and system allows multi-call capability from the premises 14 connected via an analog interface having a single phone number. Multi-call capability in accordance with the present invention includes the merging of two or more calls such as analog phone, data, video, fax and other similar calls. In accordance with the present invention, the analog telephone 18 and personal computer 16 as well as any other equipment (not shown) such as fax or video are devices and connected to or included as part of multi-call terminal equipment 20 (hereafter "terminal equipment"), and includes a modulation/demodulation device 22. The multi-call terminal equipment 20 can be integrated into one physical structure or box at the premises and can be located in a small business, residential premises, or other premises where a single point-of-attachment having a single phone line to a public switch telephone network uses an analog interface. The modulation/demodulation device 22 can be a regular modem, limited distance modem, or a line driver.

The LEC 12 is connected to the premises 14 and terminal equipment 20 by a point-of-attachment having a single phone line using an analog interface that supplies one dial tone to the premises. The public switched telephone network 10 includes Service Switching Points (SSP) 24 and a standard CCS7 signaling network 26 that is connected to a Service Control Point (SCP) 28, which also includes a database 30 as is conventional. The public switched telephone network 10 also includes a cellular network 32 that is connected to a Service Switching Point 24 via a Mobile Switching office (MSO) 34.

For purposes of describing the present invention as shown in FIG. 1, the public switched telephone network 10 also connects to a second Local Exchange Company (LEC) 40, which connects to a second premises 42 having remote devices, i.e., a personal computer 44 and analog telephone 46, and a third premises 48 having an analog telephone 50.

In accordance with the present invention, a multi-call service element (MC-SE) 52 in the form of an adjunct processor 54 is connected to the LEC 12 and is shown outside the network 10. Alternately, the multi-call service element 52 could be an integral part of the switch 24. The MC-SE could be located outside the network in a premises. The LEC 12 provides the modem-to-modem connectivity. The multi-call service element 52 includes processing hardware, including a modulation/demodulation function 55, and may have an associated database 56 that could store routing information, the telephone numbers of those subscribers who use the present system and method for establishing multi-call capability using a single phone line and analog interface. The Database 30 also can be used for storing telephone numbers of subscribers, and would be preferred.

Referring now to the flow chart of FIG. 6, and in greater detail to FIGS. 2 through 5, details of the method and system of the present invention are set forth below with a description for communicating multiple calls from a residential premises having a personal computer 16 and analog telephone 18. For purposes of clarity, each step corresponding to a block begins with the numerical sequence starting at 100. It should be understood that this description is only one example. For purposes of description, the steps will be explained with reference to the MC-SE positioned in the public switched telephone network.

The terminal equipment of the present invention contacts the public switched telephone network, and more particularly the multi-call service element and a modulated signal is established (Block 100). It should be understood, that the public switched telephone network could contact the multi-call terminal equipment for a first incoming call. The public switched telephone network 10, through its multi-call service element 52, then establishes a control channel 58 (FIG. 2) for signaling purposes between the multi-call service element and the terminal equipment 20 (Block 102). It should be understood that the establishment of a control channel could be done by either party after the modem connection has been made regardless of which side originated the modem connection. The control channel 58 is used for signaling and goes over the modulated connection. The originating terminal equipment 20 then can place a call, such as voice, data, fax or video call, via the control channel 58, to a remote multi-call terminal element that is also a subscriber to the present multi-call system, such as the personal computer 44 shown in the second premises 42 in FIG. 1 and to a remote existing terminal that is not subscriber to the present multi-call system, such as the analog telephone 50 shown in the third premises 48 in FIG. 1.

The multi-call service element 52, as part of the public switched telephone network 10, then places a call to the remote terminal equipment (Block 104). This is done through an interface to a telephone switch by signaling the need to set up a new call. The signaling on this interface naturally depends on the relationship between the multi-call service element 52 and the telephone switch 24. For example, the relationship could involve a mapping of the information flow (messages) and the information elements (semantics and syntax) between the MC-TE/MC-SE on the first interface and the MC-SE/telephone switch interface. The mapping would involve mapping a connect message on the first interface to an Initial Address Message (IAM) on the second, providing, the MC-SE has the capability of sending these messages to the SSP 24 as shown in FIG. 1.

Figure 5:
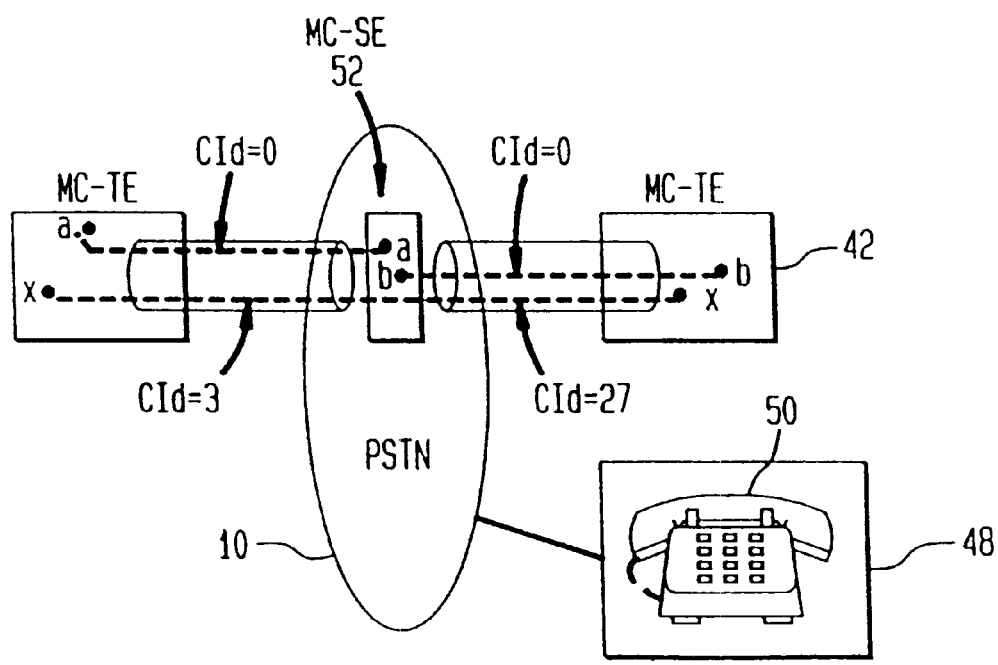
FIG. 5 is a schematic diagram showing operation of the control channel.

FIG. 5 shows the relationship of control channels between MC-SE and MCTE's. One control channel is designated by letter "a" between the premises and the PSTN, and "b" between the PSTN and the MC-TE at the second premises 42. Both control channels are labeled with channel identifier CId=0, (identifiers). As illustrated, an information channel is established between the first premises MC-TE into the PSTN, labeled CId =3, and a second information channel labeled CId=27 is established between PSTN 10 and the second premises MC-TE 42. The network maintains the mapping of CId=3 and CId=27 to support the call between premises 20 and premises 42.

When the call is made, a query is sent to the database 56 contained in the multi-call service element 52 or database 30 to determine if the called number is a subscriber to the multi-call system of the present invention (Block 106). If the called number is not a subscriber to the multi call system, or if any remote terminal equipment 42 is not using this service at the time, a normal "tip-and-ring" call is placed to the remote device (Block 108). During call set-up, unique identifiers are associated with the call (Block 105) on the calling side, and if the remote device is also a subscriber to the present invention, at the called side and the set of identifiers are associated with both sides (110).

When establishing a call using the control channel (after it has been setup), a unique identifier is chosen by the establishing party (premises for outgoing call; MC-SE for incoming call). This is used subsequently by both parties to identify the "blocks" or packets of information that flow over the channel (between the premises and the MC-SE) belonging to each call. The control channel has its own identifier (probably zero since it is the first channel established). But these identifiers are local to the premises/MC-SE channel (interface). If the remote end is also served by this invention, that MC-SE/premises pick their own identifier for the channel serving that part of the call; if not, then a regular call is set up and no identifier is used to needed at the remote end. Additionally, auxiliary information can be transmitted to aid in progressing the call.

Auxiliary information from the calling side could include the type of calling device (e.g., fax) for proper completion at the remote end or a request for language translation between the two parties.

For incoming calls, auxiliary information includes the remote side's calling party ID for display at the premise, assuming it is not blocked.

The information blocks, or packets, carry information pertaining to the channel. For the control channel, these can be messages for setting up calls. For voice channels, these are compressed and digitized voice packets. For fax channels, these are digital parts of the scanned page. The identifier is a unique number or other unique identifier. Using the unique identifier as established during the call set up, the public switched telephone network 10, through its multi-call service element 52, transmits information blocks associated with the first call between the multi-call terminal equipment 20 and the remote device (Block 112).

Figure 6:
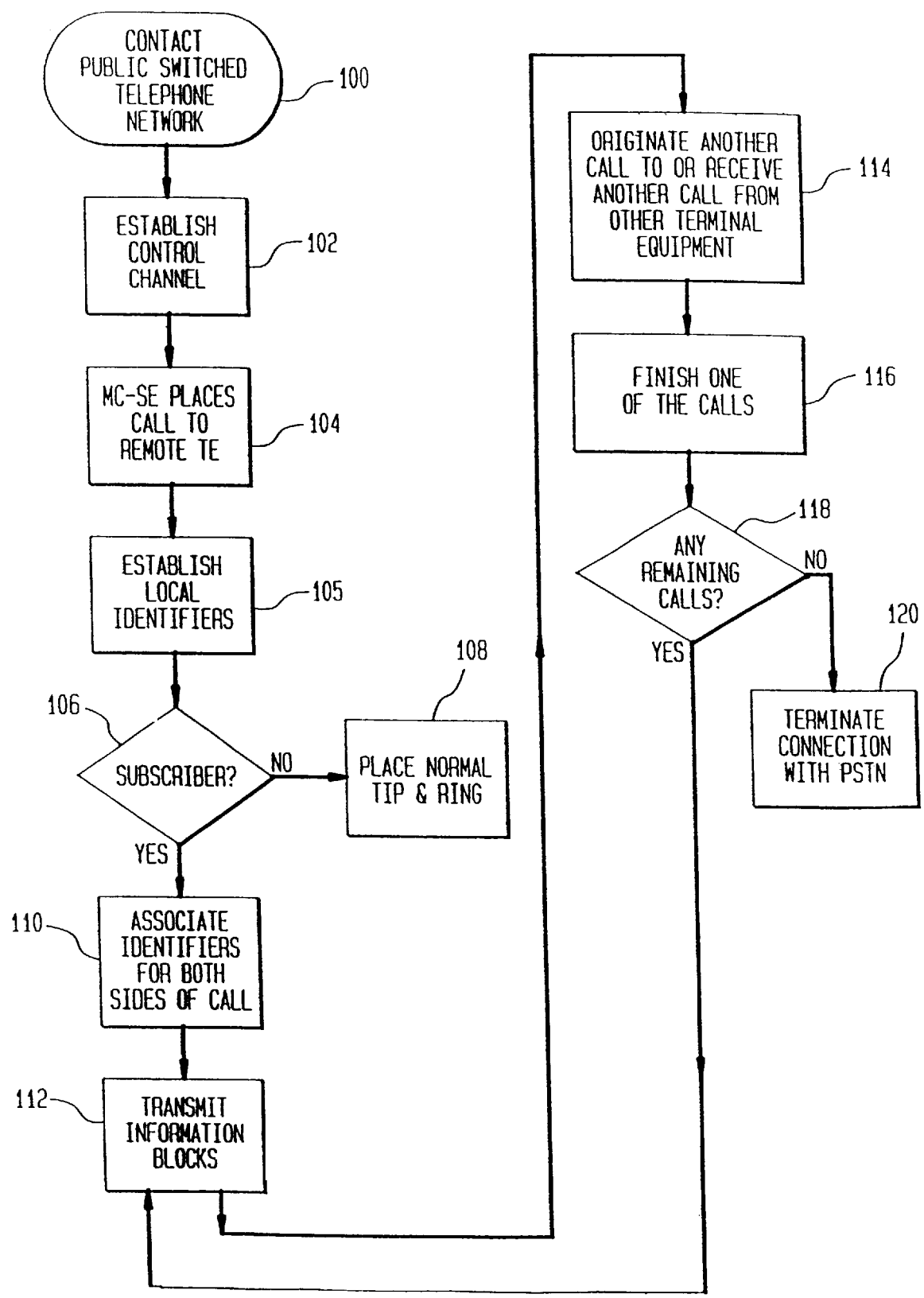
FIG. 6 is a block diagram showing one aspect of the method of the present invention.

Referring now again to the Flow Chart of FIG. 6, another call can be originated to or received from other terminal equipment (Block 114). One of the calls is then finished (Block 116). If there are any remaining calls (Block 118), then information blocks continue to be transmitted (Block 112) on the remaining channels. If there are no remaining calls, the connection can be terminated with the public switched telephone network (Block 120).

The above description allocates a separate channel identifier (e.g., CId=0) for the control channel. The control channel is used for signaling purposes to carry, for example, the phone number of the remote device to be called, or auxiliary information such as the calling party ID. A unique CId is identified in the control channel by the establishing party for the subsequent blocks for a specific call. That CId is then used in those blocks.

Figure 7:
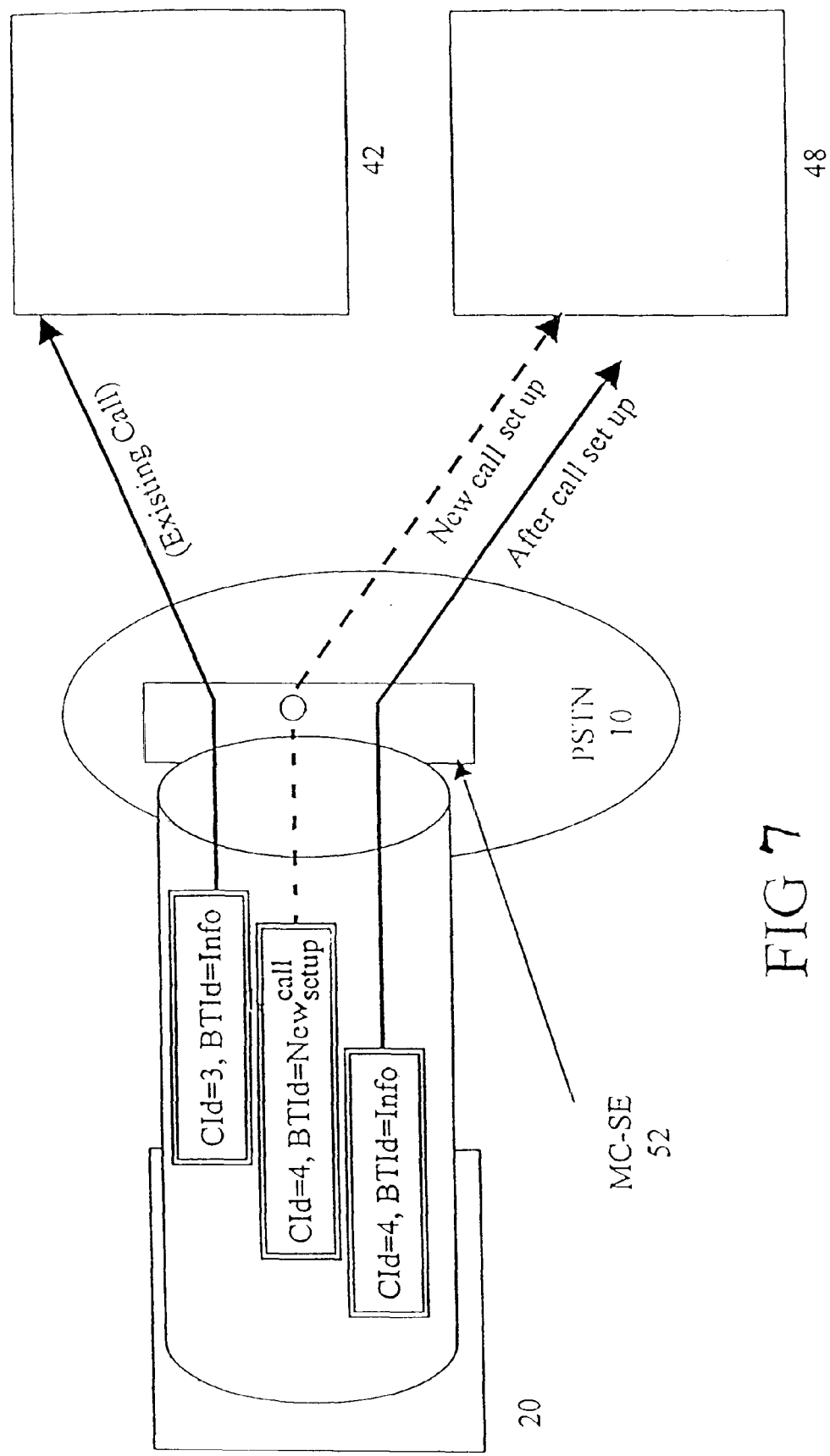
FIG. 7 is a schematic diagram showing transmission of signaling information and user information for a call in the same channel.

FIG. 7 illustrates another approach which uses the same CId both for signaling purposes as well as for the subsequent blocks that all relate to a single call. In this case, another field (such as a block-type identifier) is used to distinguish blocks for signaling from blocks to be sent to the remote device. The MC-SE 52 looks at the block-type identifier to determine whether it needs to be concerned with the content contained in the block. If so, the MC-SE 52 performs the actions specified in the block (e.g., sets up a new call or hangs up an existing call). If not, the contents of the block are conveyed to the remote device 42 or 48. As in the above case, the establishing party chooses the unique CId. In this instance, the blocks (packets) with block-type identifiers indicating the presence of signaling information can be viewed as constituting a control channel; the remaining blocks are not part of the control channel.

As illustrated in FIG. 7, information is currently being transmitted to premises MC-TE 42. This assumes, of course, the establishment of a new call between MC-TEs 20 and 42 at the prior time. (It should also be noted that the solid lines from MC-TE 20 to MC-TEs 42 and 48 indicate the communication of user information, whereas the dashed line indicates the communication of signaling blocks or packets.) As indicated by the block using CId=4 and BTId=New call Setup, a new call is attempted between MC-TEs 20 and 48. Assuming the new call is successfully completed, information blocks using the same CId=4, but now using BTId=Info, are transmitted between MC-TEs 20 and 48. Moreover, although not shown, additional blocks are being transmitted between MC-TE 20 and 42 (CId=3).

The current invention as set forth in the system and method as described above now allows multi-call capability even with the analog interface existing between the public switched telephone network 10 and a standard premises or other analog interface to be used while allowing multiple calls. Various advantages accrue as noted in the following examples.

1) A telecommuter could be working at home and accessing an e-mail server. While this interaction occurs, the telecommuter also can place a voice call to a fellow worker to discuss another project. The multi-call service of the present invention provides the capability of the telecommuter to originate two calls. Additionally, the telecommuter could receive a call while accessing the e-mail server.

2) A child can access a game server or "surf-the-web". At the same time, the child's parents can originate or receive voice calls.

3) A worker in a "small-office/home-office" may need to discuss an ongoing project with his/her partner using material in a fax. The partner may not have the proper type of terminal equipment, but the partner does have two separate phone lines, one which is connected to a fax machine. The service of the present invention can be used by the worker to split the calls within the public switched telephone network, placing the voice call to the partner on the proper line and a fax call to the other line.

4) A network trouble-shooter receives a voice call from a customer having trouble accessing the network, which is remote from the customer. Both people have multi-call terminal equipment capable of using the system of the present invention. While talking to the customer, the trouble-shooter could access the network and determine the problem and then resolve it. The customer could be directed to access the network without hanging up with the trouble-shooter. When the customer is satisfied that the problem has been resolved, each party can then release both calls.

5) A person at home could be talking to someone on a voice call. While this is occurring, someone in the same home can place a second call using the same phone line and number. The two calls can be to two different destinations.

Many other examples could occur as necessary and as the user of the system of the present invention determines are necessary.

It is to be understood that the above description is only one preferred embodiment of the invention. Numerous other arrangements may be devised by one skilled in the art without departing from the spirit and scope of the invention.

That which claimed is:

1. A method for attempting completion of a call, while at least one call is in progress, between a subscriber premises and a telecommunications network where the subscriber premises is connected by at least one point-of-attachment to the telecommunications network comprising establishing a channel between the telecommunications network and the subscriber premises, receiving at the telecommunications network through a channel from the subscriber premises signaling information of a remote device to which a call is desired, receiving at the telecommunications network from the subscriber premises a packetized modulated analog signal having a separate channel for each call, splitting the packetized modulated analog signal into respective calls which are transmitted within the same channel as the corresponding signaling information, and forwarding each call via the telecommunications network to a respective remote device based on identity information received through the channel.

2. A method according to claim 1 including splitting the calls at a public switched telephone network so they may be forwarded to different destinations.

3. A method for attempting completion of a call, while at least one call is in progress, between a subscriber premises and a telecommunications network where the subscriber premises is connected by at least one point-of-attachment to the telecommunications network comprising establishing a channel between the telecommunications network and the subscriber premises, transmitting from the telecommunications network through a channel to the subscriber premises signaling information from a remote device that a call is desired, receiving at the telecommunications network from the subscriber premises a packetized modulated analog signal having a separate channel for each call, splitting the packetized modulated analog signal into respective calls which are transmitted within the same channel as the corresponding signaling information, and forwarding each call via the telecommunications network to the subscriber premises.

4. A method according to claim 3 including combining the calls at a public switched telephone network so they may be forwarded to the subscriber premises.

5. A system for attempting completion of a call, while at least one call is in progress, between a subscriber premises and a telecommunications network where the subscriber premises is connected by at least one point-of-attachment to the telecommunications network comprising at least two channels for carrying signaling information and user information between the subscriber premises and the telecommunications network indicative of a plurality of calls;

a means located within the telecommunications network for receiving a packetized modulated analog signal having a separate channel for each call; and multi-call service element for splitting the packetized modulated analog signal into respective calls which are transmitted within the same channel as the corresponding signaling information and forwarding each call to a respective remote device based on information received through the channel.

6. A system for attempting completion of a call, while at least one call is in progress, between a subscriber premises and a telecommunications network where the subscriber premises is connected by at least one point-of-attachment to the telecommunications network comprising at least two channels for carrying signaling information and user information between the subscriber premises and the telecommunications network indicative of a plurality of calls;

a means located within the telecommunications network for receiving a packetized modulated analog signal having a separate channel for each call; and a multi-call service element for combining at the premises the channels that have originated from terminal equipment into a packetized modulated analog signal having a separate channel for each call, wherein the packetized modulated analog signal is transmitted within the same channel as the corresponding signaling information and forwarding each call to the subscriber premises.

7. A method for attempting completion of a call, while at least one call is in progress, between terminal equipment and a telephone network where the terminal equipment is connected by at least one point-of-attachment to the telephone network comprising establishing a channel between the telephone network and the terminal equipment, communicating signaling information between the terminal equipment and the telephone network through the channel including identity information of terminal equipment with which a call is desired, using channel for communicating user information, combining at the premises the channels that have originated from terminal equipment into a packetized modulated analog signal having a separate channel for each call, transmitting the signal from a modulation/demodulation device incorporated with the terminal equipment as a packetized modulated analog signal to the telephone network, splitting the packetized modulated analog signal into respective calls which are transmitted within the same channel as the corresponding signaling information, and forwarding each call to a respective remote device based on identity information received through the control channel.

8. A system for attempting completion of a call, while at least one call is in progress, between terminal equipment and a telephone network where the terminal equipment is connected by at least one point-of-attachment to the telephone network comprising at least two channels for carrying signaling information and user information between the terminal equipment and the telephone network indicative of a plurality of calls, means for combining respective calls that have originated from terminal equipment into a packetized modulated analog signal having a separate channel for each call, said terminal equipment including a modulation/demodulation device for receiving and transmitting a packetized modulated analog signal to the telephone network, and a multi-call service element for splitting the packetized modulated analog signal into respective calls which are transmitted within the same channel as the corresponding signaling information, and forwarding each call to a respective remote device based on identity information received through the control channel.

* * * * *